United States Patent
Chen et al.

(10) Patent No.: US 8,788,704 B1
(45) Date of Patent: Jul. 22, 2014

(54) SENDING INCOMING CALLING ID TO DEVICES AFTER INITIATION OF A CALL

(75) Inventors: Henry Chen, Plano, TX (US); Jerry Liou, Plano, TX (US); Jeffery Sanders, Cocoa, FL (US); Jiahe Zhuang, Allen, TX (US); Tom Desjardins, Lucas, TX (US)

(73) Assignee: Cisco Technology, Inc., San Jose, CA (US)

( * ) Notice: Subject to any disclaimer, the term of this patent is extended or adjusted under 35 U.S.C. 154(b) by 1634 days.

(21) Appl. No.: 11/737,113

(22) Filed: Apr. 18, 2007

(51) Int. Cl.
*H04L 29/06* (2006.01)
*H04M 3/42* (2006.01)
*H04M 7/00* (2006.01)
*H04Q 3/00* (2006.01)
*H04Q 3/68* (2006.01)

(52) U.S. Cl.
USPC ............ 709/240; 709/227; 709/246; 379/900

(58) Field of Classification Search
None
See application file for complete search history.

(56) References Cited

U.S. PATENT DOCUMENTS

| | | | |
|---|---|---|---|
| 6,442,248 B1 | 8/2002 | Davis | |
| 6,700,955 B1 | 3/2004 | Davis et al. | |
| 6,760,324 B1 | 7/2004 | Scott et al. | |
| 6,765,931 B1 | 7/2004 | Rabenko et al. | |
| 6,985,492 B1 | 1/2006 | Thi et al. | |
| 7,023,868 B2 | 4/2006 | Rabenko et al. | |
| 7,106,839 B2 | 9/2006 | Davis | |
| 7,123,608 B1 | 10/2006 | Scott et al. | |
| 2001/0037174 A1* | 11/2001 | Dickerson | 701/200 |
| 2002/0105943 A1* | 8/2002 | Womack et al. | 370/352 |
| 2002/0112073 A1* | 8/2002 | MeLampy et al. | 709/240 |
| 2003/0235184 A1* | 12/2003 | Dorenbosch et al. | 370/352 |
| 2004/0151296 A1* | 8/2004 | Gamble | 379/218.01 |
| 2005/0078690 A1* | 4/2005 | DeLangis | 370/401 |
| 2005/0157708 A1* | 7/2005 | Chun | 370/356 |
| 2005/0249196 A1* | 11/2005 | Ansari et al. | 370/352 |
| 2006/0018310 A1* | 1/2006 | Stevens et al. | 370/356 |
| 2006/0133354 A1* | 6/2006 | Lee | 370/352 |
| 2007/0070948 A1* | 3/2007 | Kezys et al. | 370/331 |
| 2007/0154005 A1* | 7/2007 | Daigle | 379/211.04 |

OTHER PUBLICATIONS

Glenn Yancey, et al., "Building Residential VoIP Gateways: A Tutorial, Part Two: VoIP Telephony Interfaces", VoIP Group, Texas Instruments Incorporated, 8 pages, pub 2000.

* cited by examiner

*Primary Examiner* — Asad Nawaz
*Assistant Examiner* — Jason Harley
(74) *Attorney, Agent, or Firm* — Fish & Richardson P.C.

(57) ABSTRACT

In one embodiment, a method includes sending a call invite message to initiate a call with one or more callee devices. In one example, the call invite message may be a session initiation protocol (SIP) INVITE message. The invite message may be sent to a multi-line system that is shared between multiple callee devices (e.g., a key system). A calling identifier (ID) may then be received by a callee device after sending the call invite message. The calling ID is then sent in an update message to the one or more callee devices. For example, the update message may be a SIP UPDATE message. The callee devices can then use the calling identifier to perform an action, such as displaying the calling ID for a callee to view. Accordingly, a method for providing a calling ID to a callee device is provided when a call invite message has already been sent.

31 Claims, 5 Drawing Sheets

SENDING INCOMING CALLING ID TO DEVICES AFTER INITIATION OF A CALL

TECHNICAL FIELD

Particular embodiments generally relate to telephony.

BACKGROUND

A calling ID is used to inform a callee device of a caller's identification information, such as the caller's telephone number. The calling ID is sent by a central office in the ringing cycle, such as in between the first and second rings. In a voice over IP system, a foreign exchange office (FXO) may receive a call from a caller and then initiate a call by sending an invite message to a session initiation protocol (SIP) proxy. The proxy can forward the Invite message to a telephone device to start the ringing of the device. The invite message in SIP is typically used to send identification information to a device. However, because the invite has already been sent and Callee devices have not answered the call yet, when the calling ID is received, it is not sent to the telephone device. One method may be to delay the invite until the calling ID is received. However, this delays initiation of the call and may not be desirable.

DESCRIPTION OF EXAMPLE EMBODIMENTS

Overview

In one embodiment, a method includes sending a call invite message to initiate a call with one or more callee devices. In one example, the call invite message may be a session initiation protocol (SIP) INVITE message. The invite message may be sent to a multi-line system that is shared between multiple callee devices (e.g., a key system). A calling identifier (ID) may then be received by a callee device after sending the call invite message. For example, the calling ID may be received at a foreign exchange office (FXO) after a first ring in a ringing cycle. The calling ID is then sent in an update message to the one or more callee devices. For example, the update message may be a SIP UPDATE message. In one example, the update message may be sent to a SIP proxy server, which can then fork the update message to the one or more callee devices. The callee devices can then use the calling identifier to perform an action, such as displaying the calling ID for a callee to view. Accordingly, a method for providing a calling ID to a callee device is provided when a call invite message has already been sent. Thus, the calling ID and call invite message are sent asynchronously.

Example Embodiments

Figure 1:
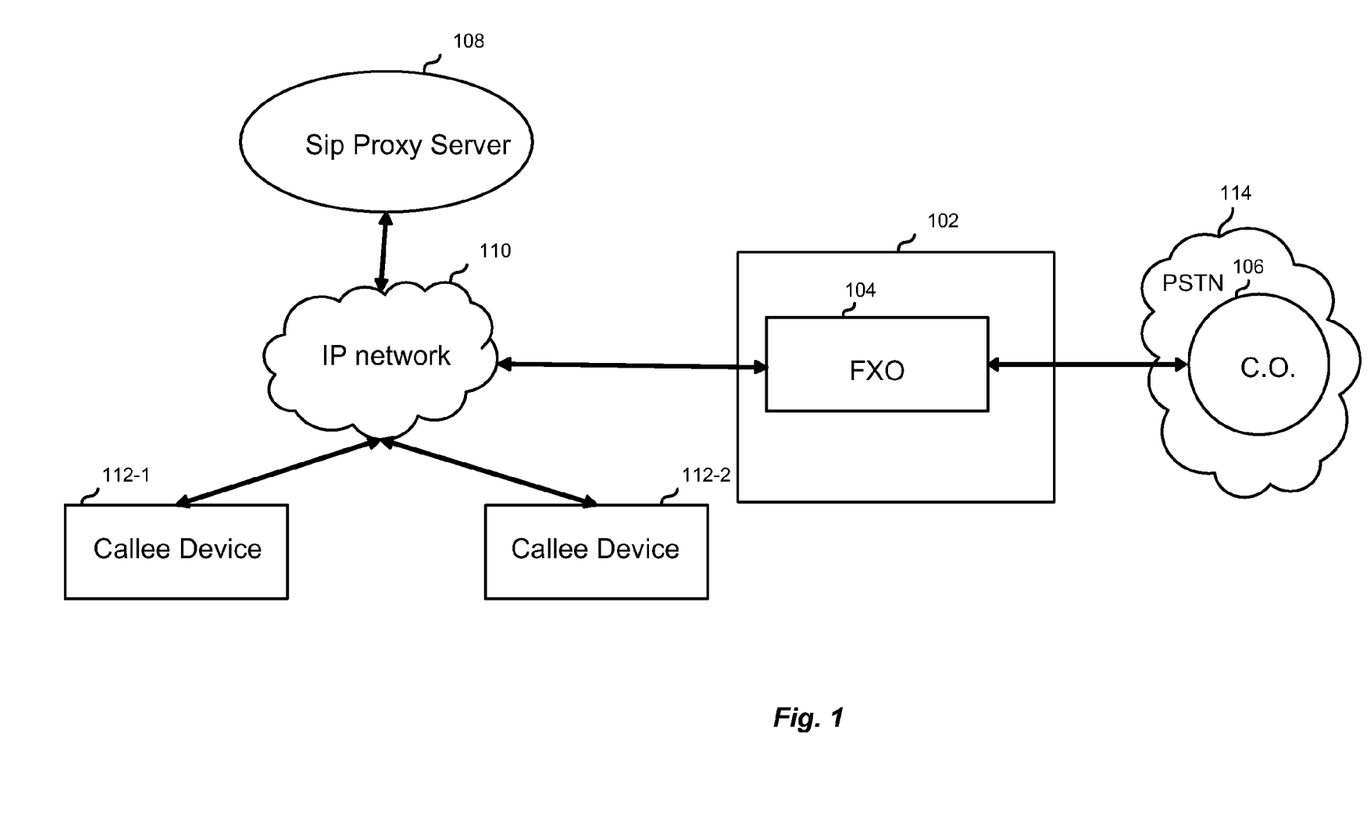
FIG. 1 depicts an example of a system for sending a calling ID.

FIG. 1 depicts an example of a system for sending a calling ID. As shown, a gateway 102, a foreign exchange office line interface (FXO) 104, a central office 106, a SIP proxy server 108, an Internet Protocol (IP) network 110, a public switched telephone network (PSTN) network 114, and callee devices 112 are provided.

IP network 110 may be any packet-based network. For example, IP network 110 may be a local area network (LAN), wide area network (WAN), a wireless network, etc.

Gateway 102 may be a PSTN/FXO gateway. Gateway 102 provides an interface between IP network 104 and a PSTN network. FXO 104 may be a foreign exchange office (FXO) interface. FXO 104 is configured to interface with the PSTN network and may receive calls from central office 106 and also send signaling to SIP proxy 108 to connect the calls.

PSTN may be a circuit switched network. PSTN 114 may provide plain old telephone service (POTS) from a local telephone company's central office (CO) 106.

Central office 106 may be a physical building used to house equipment that provides telephone service. Central office 106 may include switches 118 or any other telephone devices that provide a call to PSTN devices or telephones (not shown). Although a central office is described, it will be understood that other structures or systems may be used. A trunk is provided between FXO 104 and a PSTN network device in central office 106. The trunk may be a line that is used to provide the call between plain old telephone service (POTS) and callee device 112.

SIP proxy server 108 is configured to send messages to callee devices 112. In one embodiment, SIP proxy server 108 is a SIP server that communicates using a SIP protocol. Although a SIP protocol is described, it will be understood that other protocols may be appreciated. For example, H.323, or other comparable protocols or successor protocols may be used.

Callee devices 112 may be referred to as customer premise equipment (CPE) and may include voice over IP (VoIP) devices. In one example, callee devices 112 may be part of a key system that provides a shared line system. A key system is a multi-line telephone system that allows for expandability and has individual line selection for different phone lines. In the key system, multiple callee devices 112 ring at substantially the same time or substantially simultaneously when a call is received.

Callee devices 112 may be configured to display a calling ID if it is received from SIP proxy server 108. In one example, the calling ID may be displayed while callee device 112 is ringing. Callee devices 112 may also take other actions based on the calling ID, such as re-routing of calls, etc.

The calling ID may be any information for the caller. For example, the calling ID may be a caller identification (CID) or a caller number identification (CNID). A telephony intelligent network service may transmit the caller's telephone number. Other information may also be sent with the calling ID, such as a caller's name.

Particular embodiments are configured to allow a calling ID to be displayed on callee device 112 after the call is initiated. For example, the calling ID can be sent after a SIP INVITE message has already been sent. Particular embodiments provide the calling ID using an update message, such as a SIP UPDATE message. Although a SIP UPDATE message is described, it will be understood that other messages may be used, such as a ReInvite, but ReInvite cannot be used before the call be answered. When an update message is used, it may mean any message sent after the INVITE message is received. In one embodiment, the calling ID may be sent in a header attribute in the UPDATE message or the session description protocol (SDP) of the message. When callee device 112 receives a SIP UPDATE message with the calling ID information in it, it can use the information to display the calling ID. Thus, particular embodiments provide a method for providing calling ID asynchronously with the invite message. In a telephone system, the calling ID may be received by FXO 104 after the call is initiated or a ringing signal is sent. For example, the calling ID may be received after the first or second ring. Thus, if FXO 104 sends the invite to start the call process with callee device 112, then a method to send the calling ID after the invite is sent is needed. The update message is thus used to sending the calling ID.

Figure 2:
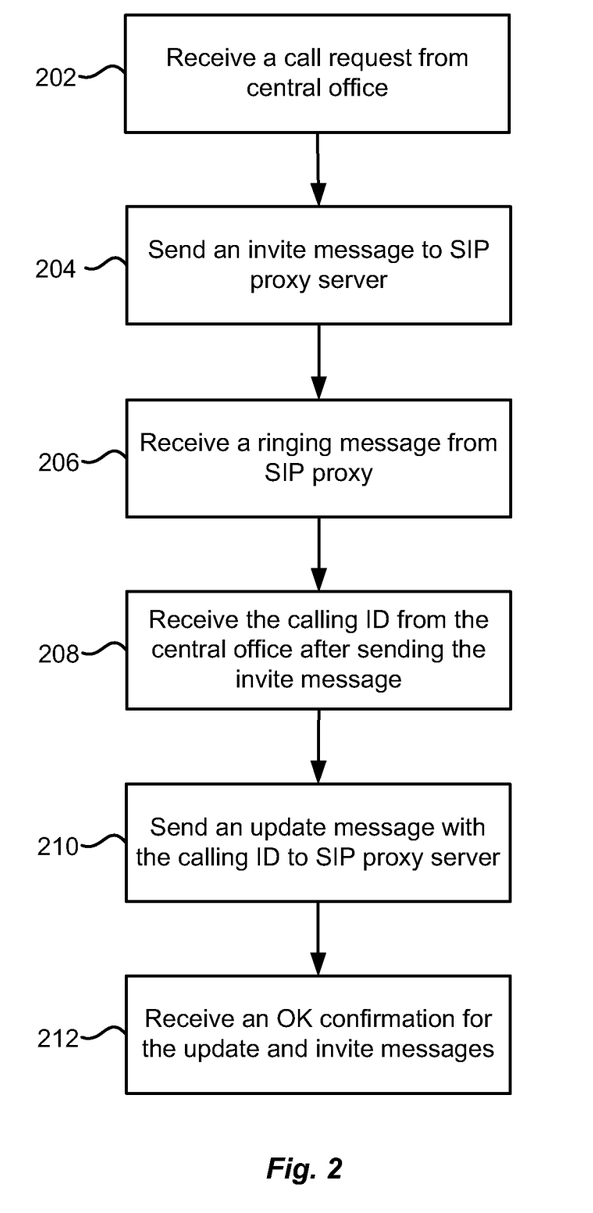
FIG. 2 depicts an example of sending the calling ID to a SIP proxy.

FIG. 2 depicts an example of sending the calling ID information. In one embodiment, the process described by FIG. 2 is performed by FXO 104. Step 202 receives a call request from central office 106. The call request may be in the form of a ringing voltage.

Step 204 sends an invite message to SIP proxy server 108. In one example, the invite message may be a SIP INVITE message.

Step 206 receives a ringing message from SIP proxy 108. In this case, SIP proxy 108 may have sent the SIP INVITE to one or more callee devices 112. The callee devices 112 may then have sent back 180 SIP RINGING responses to SIP proxy server 108.

Step 208 receives the calling ID from central office 106 after sending the invite message. For example, the calling ID may be received after a first ring has been received.

Step 210 sends an update message with the calling ID to SIP proxy server 108. In one embodiment, the update message may be a SIP UPDATE message. The update message includes the calling ID. The Sip proxy server 108 then forwards the update message with the calling ID to callee devices 112.

Step 212 receives an OK confirmation message for the update and invite messages. For example, a 200 OK may be received for the update and invite messages. This indicates that the update and invite messages were received. Accordingly, it is expected that callee device 112 has received a calling ID and may have displayed the calling ID during the ringing.

SIP proxy server 108 may forward messages received from FXO 104. In one example, SIP proxy server 108 may forward messages to multiple callee devices 112 that may be present in a key system or any other VoIP system. This substantially simultaneously rings multiple callee devices 112.

Figure 3:
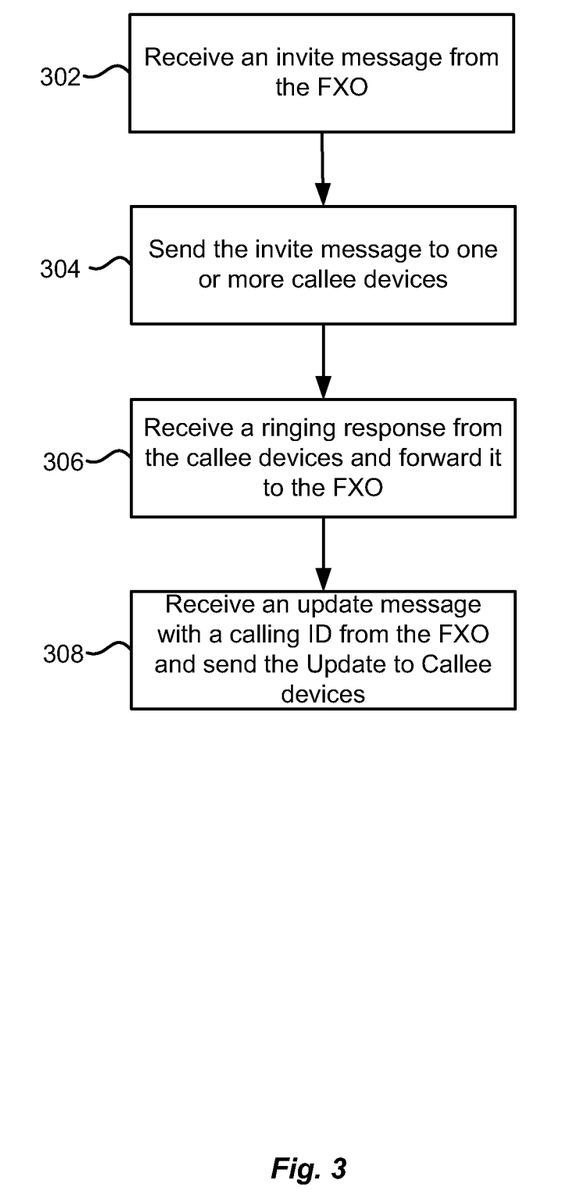
FIG. 3 depicts an example of a method for sending a calling ID to callee devices.

FIG. 3 depicts an example of a method for sending a calling ID to callee devices 112. In one embodiment, the process described in FIG. 3 is performed by SIP proxy server 108. Step 302 receives an invite message from FXO 104. Step 304 then sends the invite message to one or more callee devices 112. The invite message may be sent substantially simultaneously.

Step 306 then receives a ringing message, such as a 180 RINGING response, from callee devices 112 and forwards it to FXO 104.

Step 308 then receives an update message with a calling ID from FXO 104. Step 310 then forwards the update message to one or more callee devices 112. This sends the calling ID to callee devices 112 simultaneously. Thus, callee devices 112 can display the calling ID during the ringing.

Figure 4:
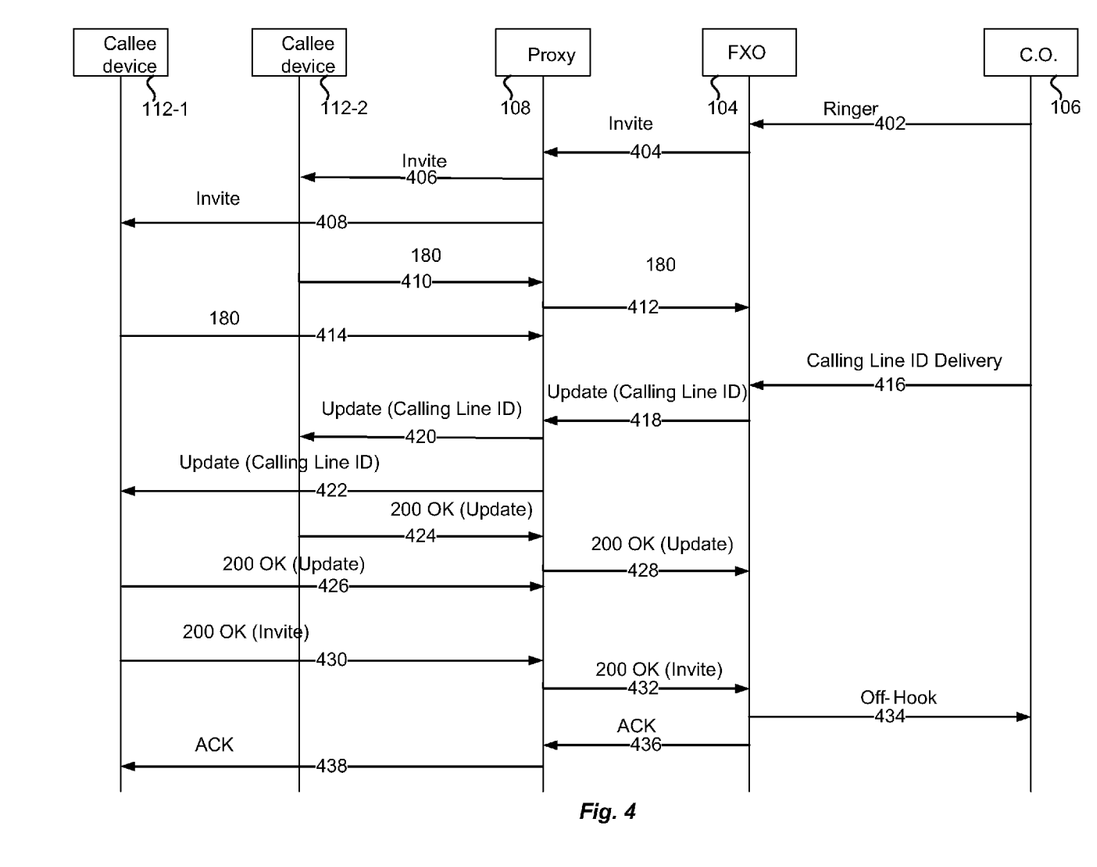
FIG. 4 depicts an example of a call flow for providing a calling ID.

FIG. 4 depicts an example of a call flow for providing a calling ID. Although this call flow is described, it will be understood that other messages may be sent that are not shown. At 402, a ringing signal is sent from central office 106 to FXO 104.

At 404, FXO 104 sends an invite message to SIP proxy server 108. SIP proxy server 108 may then fork the invite message to callee devices 112-1 and 112-2 at 406 and 408.

Callee devices 112-1 and 112-2 may then individually send ringing responses, such as 180 RINGING response, back to SIP proxy server 108 at 410 and 414. SIP proxy server 108 receives the ringing responses and only sends one response back to FXO 104 at 412.

At 416, a calling ID may be sent from central office 106 to FXO 104. FXO 104 then sends an update message that includes a calling ID at 418. SIP proxy server 108 then may fork the update message to callee devices 112-1 and 112-2 at 420 and 422. The update message may be sent substantially simultaneously. Thus, multiple calling ID updates may be sent from a single inbound trunk call.

At 424 and 426, callee devices 112-1 and 112-2 send 200 OK (UPDATE) messages to SIP proxy server 108. This indicates that the update message has been received. SIP proxy server 108 may then send a 200 OK (UPDATE) message back to FXO 104 at 428.

At 430, callee device 112-1 may send a 200 OK (INVITE) to SIP proxy server 108. In this case, callee device 112-1 may have answered the call. However, callee device 112-2 did not answer the call and thus does not send a 200 OK (INVITE). At 432, the 200 OK (INVITE) is sent to FXO 104. FXO 104 then sends an off-hook signal at 434 to central office 106. This indicates a callee device has answered the call.

FXO 104 sends an ACK to SIP proxy server 108 at 436, which can then forward the ACK to callee device 112-1 at 438.

Figure 5:
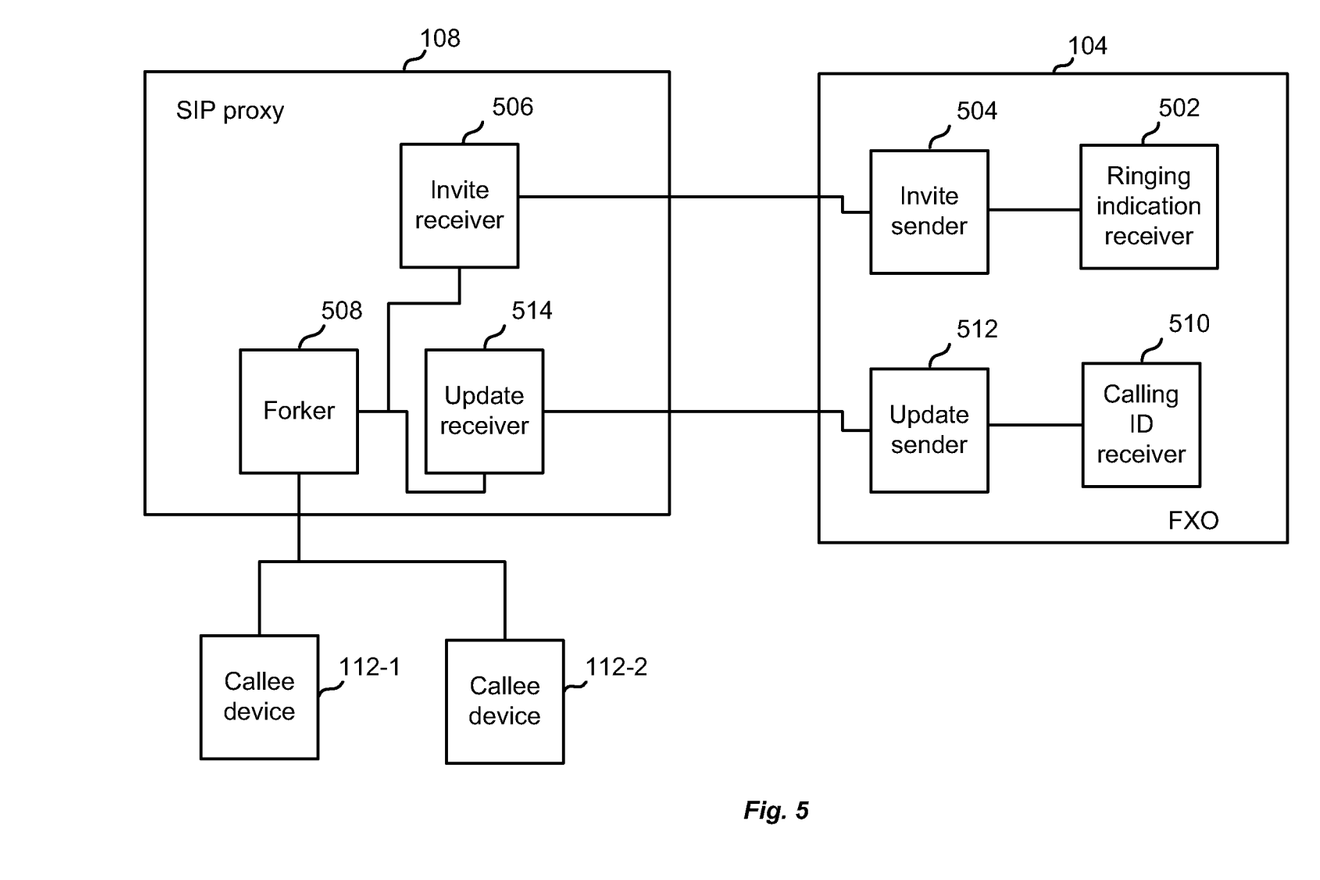
FIG. 5 depicts a more detailed example of a foreign exchange office (FXO) and SIP proxy server.

FIG. 5 depicts a more detailed example of FXO 104 and SIP proxy server 108. Although these functions are described as being specific in FXO 104 and SIP proxy server 108, it will be understood that the functions may be provided in other devices.

A ringing indication receiver 502 is configured to receive a ringing signal from central office 106. An invite sender 504 then sends an invite to SIP proxy server 108.

At SIP proxy server 108, an invite receiver 506 receives the invite and forwards it to a message forker 508. Message forker 508 is configured to fork the invite message to multiple callee devices 112.

At FXO 104, caller ID receiver 510 may then receive a calling ID from central office 106 after the invite has been sent. An update sender 512 then sends an update message with the calling ID to SIP proxy server 108.

At SIP proxy server 108, an update receiver 514 receives the update message and sends it to message forker 508. Message forker 508 may then fork the update message with the calling ID to multiple callee devices 112 substantially simultaneously. SIP proxy server 108 and FXO 104 process the call as was described above.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as standalone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory.

Particular embodiments can be implemented in the form of control logic in software or hardware or a combination of both. The control logic, when executed by one or more processors, may be operable to perform that what is described in particular embodiments.

A "processor" or "process" includes any human, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. A method comprising: receiving, at a network device and from a network node in a public switched telephone network (PSTN), network information indicating a call request from a calling device associated with the PSTN to callee devices associated with an Internet Protocol (IP) network, wherein the network information is received using a telephony protocol;

responsive to receiving the network information, sending, by the network device, a call invite message to a server in the IP network to initiate a call with the callee devices, wherein the callee devices are on a shared line and the call invite message is forwarded by the server to the callee devices simultaneously;

receiving, at the network device, a ringing message from the server that indicates that at least one callee device has received the call invite message;

subsequent to sending the call invite message to the server in the IP network, receiving, at the network device and from the network node in the PSTN using the telephony protocol, a calling identifier for the calling device;

based on receiving the calling identifier for the calling device, generating, by the network device, an update message that includes the calling identifier; and sending, by the network device, the update message to the server, wherein the update message is forked into a number of update messages that corresponds to a number of the callee devices and forwarded to the callee devices such that the calling identifier is configured to be displayed simultaneously by the callee devices while the callee devices are ringing.

2. The method of claim 1, wherein the call invite message includes a session initiation protocol (SIP) INVITE message that initiates the call.

3. The method of claim 2, wherein the update message includes a SIP UPDATE message that is sent after initiation of the call.

4. The method of claim 1, wherein the network node includes a central office (CO) associated with a plain old telephone service (POTS) that is provided by the PSTN, and wherein receiving the network information indicating the call request from the calling device includes receiving a ringing voltage from the CO.

5. The method of claim 1, wherein the update message is a SIP UPDATE message and the calling identifier is a telephone number of the calling device, and wherein including the calling identifier in the update message comprises inserting the telephone number of the calling device in a header or session description protocol (SDP) of the SIP UPDATE message.

6. The method of claim 1, wherein the server in the IP network includes a SIP proxy device that is configured to send the update message to the callee devices.

7. The method of claim 1, wherein the network device includes a foreign exchange office line interface (FXO), the method comprising: configuring the network device to serve as a gateway device between the PSTN and the IP network using the FXO.

8. The method of claim 1, wherein receiving, from the network node in the PSTN using the telephony protocol, a calling identifier for the calling device comprises receiving one of a caller identification (CID) or a caller number identification (CNID) from the network node using a telephony intelligent network service.

9. An apparatus comprising: one or more processors; and logic encoded in one or more non-transitory tangible media for execution by the one or more processors and when executed operable to cause the one or more processors to perform operations including: receiving, at a network device and from a network node in a public switched telephone network (PSTN), network information indicating a call request from a calling device associated with the PSTN to callee devices associated with an Internet Protocol (IP) network, wherein the network information is received using a telephony protocol;

responsive to receiving the network information using the telephony protocol, sending, by the network device, a call invite message to a server in the IP network to initiate a call with the callee devices, wherein the callee devices are on a shared line and the call invite message is forwarded by the server to the callee devices simultaneously;

receiving, at the network device, a ringing message from the server that indicates that at least one callee device has received the call invite message;

subsequent to sending the call invite message to the server in the IP network, receiving, at the network device and from the network node in the PSTN using the telephony protocol, a calling identifier for the calling device;

based on receiving the calling identifier for the calling device, generating, by the network device, an update message that includes the calling identifier; and sending, by the network device, the update message to the server, wherein the update message is forked into a number of update messages that corresponds to a number of the callee devices and forwarded to the callee devices such that the calling identifier is configured to be displayed simultaneously by the callee devices while the callee devices are ringing.

10. The apparatus of claim 9, wherein the call invite message includes a session initiation protocol (SIP) INVITE message that initiates the call.

11. The apparatus of claim 10, wherein the update message includes a SIP UPDATE message that is sent after initiation of the call.

12. The apparatus of claim 9, wherein the network node includes a central office (CO) in the PSTN and wherein receiving the network information indicating the call request from the calling device includes receiving a ringing voltage from the CO.

13. The apparatus of claim 9, wherein the update message is a SIP UPDATE message and the calling identifier is a telephone number of the calling device, and wherein the logic when executed is operable to insert the telephone number of the calling device in a header or session description protocol (SDP) of the SIP UPDATE message.

14. The apparatus of claim 9, the server in the IP network includes a SIP proxy device that is configured to send the update message to the callee devices.

15. The apparatus of claim 9, wherein the network device includes a foreign exchange office line interface (FXO), and wherein the logic is operable to cause the one or more processors to perform operations including: configuring the network device to serve as a gateway device between the PSTN and the IP network using the FXO.

16. A method comprising: receiving, at a network server, a call invite message from a network device indicating a request from a calling device associated with a public switched telephone network (PSTN) to initiate a call with callee devices associated with an Internet Protocol (IP) network;

determining, by the server, that the callee devices are on a shared line; based on determining that the callee devices are on a shared line, sending, by the server, the call invite message simultaneously to the callee devices on the shared line;

receiving, at the server, ringing messages from one or more callee devices, wherein the ringing messages indicate that the at least one corresponding one or more callee devices have received the call invite message;

forwarding, by the server, one of the ringing messages to the network device; subsequent to forwarding one of the ringing messages to the network device, receiving, at the server, an update message from the network device, wherein the update message includes a calling identifier for the calling device;

forking, by the server, the update message into a number of update messages that corresponds to a number of the callee devices; and forwarding, by the server, the number of update messages simultaneously to the callee devices such that the calling identifier is displayed simultaneously by the callee devices while the callee devices are ringing.

17. The method of claim 16, wherein the call invite message includes a session initiation protocol (SIP) INVITE message that initiates the call, and wherein the update message includes a SIP UPDATE message that is sent after initiation of the call.

18. The method of claim 17, wherein the calling identifier is a telephone number of the calling device, and wherein the telephone number of the calling device is included in a header or session description protocol (SDP) of the SIP UPDATE message.

19. The method of claim 16, wherein the server in includes a SIP proxy device and the network device includes a foreign exchange office line interface (FXO), the method comprising: configuring the network device to serve as a gateway device between the PSTN and the IP network using the FXO and the SIP proxy device.

20. An apparatus comprising: one or more processors; and logic encoded in one or more non-transitory tangible media for execution by the one or more processors and when executed operable to cause the one or more processors to perform operations comprising:
receiving, at a network server, a call invite message from a network device indicating a request from a calling device associated with a public switched telephone network (PSTN) to initiate a call with callee devices associated with an Internet Protocol (IP) network;
determining, by the server, that the callee devices are on a shared line; based on determining that the callee devices are on a shared line, sending, by the server, the call invite message simultaneously to the callee devices on the shared line; receiving, at the server, ringing messages from one or more callee devices, wherein the ringing messages indicate that the corresponding one or more callee devices have received the call invite message;
forwarding, by the server, one of the ringing messages to the network device; subsequent to forwarding one of the ringing messages to the network device, receiving, at the server, an update message from the network device, wherein the update message includes a calling identifier for the calling device;
forking, by the server, the update message into a number of update messages that corresponds to a number of the callee devices; and
forwarding, by the server, the number of update messages simultaneously to the callee devices such that the calling identifier is displayed simultaneously by the callee devices while the callee devices are ringing.

21. The apparatus of claim 20, wherein the call invite message includes a session initiation protocol (SIP) INVITE message that initiates the call, and wherein the update message includes a SIP UPDATE message that is sent after initiation of the call.

22. The apparatus of claim 21, wherein the calling identifier is a telephone number of the calling device, and wherein the telephone number of the calling device is included in a header or session description protocol (SDP) of the SIP UPDATE message.

23. The apparatus of claim 20, wherein the server in includes a SIP proxy device, and wherein the network device includes a foreign exchange office line interface (FXO) that is configured to serve as a gateway device between the PSTN and the IP network using the FXO and the SIP proxy device.

24. A computer program product, suitably embodied in a non-transitory machine-readable medium and including instructions for execution by a processor that when executed, are configured to cause the processor to perform operations comprising:
receiving, at a network device and from a network node in a public switched telephone network (PSTN), network information indicating a call request from a calling device associated with the PSTN to callee devices associated with an Internet Protocol (IP) network, wherein the network information is received using a telephony protocol;
responsive to receiving the network information, sending, by the network device, a call invite message to a server in the IP network to initiate a call with the callee devices, wherein the callee devices are on a shared line and the call invite message is forwarded by the server to the callee devices simultaneously;
receiving, at the network device, a ringing message from the server that indicates that at least one callee device has received the call invite message;
subsequent to sending the call invite message to the server in the IP network, receiving, at the network device and from the network node in the PSTN using the telephony protocol, a calling identifier for the calling device;
based on receiving the calling identifier for the calling device, generating, by the network device, an update message that includes the calling identifier; and
sending, by the network device, the update message to the server, wherein the update message is forked into a number of update messages that corresponds to a number of the callee devices and forwarded to the callee devices such that the calling identifier is configured to be displayed simultaneously by the callee devices while the callee devices are ringing.

25. The computer program product of claim 24, wherein the call invite message includes a session initiation protocol (SIP) INVITE message that initiates the call, and wherein the update message includes a SIP UPDATE message that is sent after initiation of the call.

26. The computer program product of claim 24, wherein the update message is a SIP UPDATE message and the calling identifier is a telephone number of the calling device, and wherein the instructions are configured to cause the processor to perform operations comprising: inserting, by the network device, the telephone number of the calling device in a header or session description protocol (SDP) of the SIP UPDATE message.

27. The computer program product of claim 24, wherein the network device includes a foreign exchange office line interface (FXO), and wherein the instructions are configured to cause the processor to perform operations comprising:
configuring the network device to serve as a gateway device between the PSTN and the IP network using the FXO.

28. A computer program product, suitably embodied in a non-transitory machine-readable medium and including instructions for execution by a processor that when executed, are configured to cause the processor to perform operations comprising:
receiving, at a network server, a call invite message from a network device indicating a request from a calling device associated with a public switched telephone network (PSTN) to initiate a call with callee devices associated with an Internet Protocol (IP) network;
determining, by the server, that the callee devices are on a shared line;
based on determining that the callee devices are on a shared line, sending, by the server, the call invite message simultaneously to the callee devices on the shared line;
receiving, at the server, ringing messages from one or more callee devices, wherein the ringing messages indicate that the corresponding one or more callee devices have received the call invite message;

forwarding, by the server, one of the ringing messages to the network device;

subsequent to forwarding one of the ringing messages to the network device, receiving, at the server, an update message from the network device, wherein the update message includes a calling identifier for the calling device;

forking, by the server, the update message into a number of update messages that corresponds to a number of the callee devices; and forwarding, by the server, the number of update messages simultaneously to the callee devices such that the calling identifier is displayed simultaneously by the callee devices while the callee devices are ringing.

29. The computer program product of claim 28, wherein the call invite message includes a session initiation protocol (SIP) INVITE message that initiates the call, and wherein the update message includes a SIP UPDATE message that is sent after initiation of the call.

30. The computer program product of claim 29, wherein the calling identifier is a telephone number of the calling device, and wherein the telephone number of the calling device is included in a header or session description protocol (SDP) of the SIP UPDATE message.

31. The computer program product of claim 28, wherein the server in includes a SIP proxy device, and wherein the network device includes a foreign exchange office line interface (FXO) that is configured to serve as a gateway device between the PSTN and the IP network using the FXO and the SIP proxy device.

* * * * *